(12) United States Patent
Doenges et al.

(10) Patent No.: US 6,313,287 B1
(45) Date of Patent: Nov. 6, 2001

(54) WATER-SOLUBLE, SULFOALKYL-CONTAINING, HYDROPHOBICALLY MODIFIED CELLULOSE ETHERS, PROCESSES FOR PREPARING THEM, AND THEIR USE IN EMULSION PAINTS

(75) Inventors: Reinhard Doenges, Bad Soden; Juergen Kirchner, Wiesbaden, both of (DE)

(73) Assignee: Clariant GmbH, Stuttgart (DE)

( * ) Notice: Subject to any disclaimer, the term of this patent is extended or adjusted under 35 U.S.C. 154(b) by 0 days.

(21) Appl. No.: 09/427,351

(22) Filed: Oct. 26, 1999

(30) Foreign Application Priority Data

Oct. 27, 1998 (DE) ................................ 198 49 442

(51) Int. Cl.$^7$ .................................................. C08B 11/00
(52) U.S. Cl. .................................. 536/92; 536/90; 536/91
(58) Field of Search .................... 536/90, 91, 92

(56) References Cited

U.S. PATENT DOCUMENTS

| 5,278,304 | 1/1994 | Kniewske et al. . |
| 5,358,561 | 10/1994 | Kiesewetter et al. . |
| 5,591,844 | 1/1997 | Bartz et al. . |
| 5,708,162 | 1/1998 | Hilbig et al. . |

FOREIGN PATENT DOCUMENTS

| 0 307 915 B1 | 3/1989 | (EP) . |
| 0 511 540 | 11/1992 | (EP) . |
| 0 554 751 | 8/1993 | (EP) . |
| 0 573 852 | 12/1993 | (EP) . |
| 0 781 780 | 7/1997 | (EP) . |

OTHER PUBLICATIONS

"New Alkylated 0–(2–Sulfoethyl)cellulose and its Properties", P. Talaba, Chem. Papers 50(2)101–104, 1996.

"Water–Soluble Cellulose Derivatives and Their Commercial Use", T.M. Greenway, Berol Nobel Ltd., St. Albans, Herts AL1 3AW, United Kingdom.

Primary Examiner—Elli Peselev
(74) Attorney, Agent, or Firm—Scott E. Hanf

(57) ABSTRACT

Water-soluble sulfoalkyl-containing hydrophobically modified cellulose ethers, processes for preparing them, and their use in emulsion paints The present invention relates to water-soluble ionic cellulose ethers from the group of the hydroxyalkylcelluloses which are substituted by on average from 0.001 to 1.0 alkyl group per anhydroglucose unit and which carry from 0.01 to 0.1 sulfoalkyl group per anhydroglucose unit, to processes for preparing them and to the use of water-soluble ionic cellulose ethers from the group of the hydroxyalkylcelluloses which are substituted by on average from 0.001 to 1.0 alkyl group per anhydroglucose unit and which carry from 0.01 to 0.4 sulfoalkyl group per anhydroglucose unit in emulsion paints.

1 Claim, No Drawings

WATER-SOLUBLE, SULFOALKYL-CONTAINING, HYDROPHOBICALLY MODIFIED CELLULOSE ETHERS, PROCESSES FOR PREPARING THEM, AND THEIR USE IN EMULSION PAINTS

CROSS REFERENCE TO RELATED APPLICATION

The present invention is described in the German priority application No. 19849442.4 filed Oct. 27, 1998 which is hereby incorporated by reference as is fully disclosed herein.

The present invention relates to water-soluble, sulfoalkyl-containing, hydrophobically modified cellulose ethers, to processes for preparing them and to their use, and to emulsion paints comprising these compounds.

Commercially customary emulsion paints possess pronounced pseudoplasticity. This stands in contrast to the processor's requirements for paints having more Newtonian rheology, which offer distinct advantages in terms of brushability, flow and drip. By using cellulose ethers modified hydrophobically with long-chain alkyl groups as thickeners, or by using conventional cellulose ethers in combination with synthetic associative thickeners, a more Newtonian rheology can be established in emulsion paints.

A disadvantage of the commercial thickeners comprising cellulose ethers modified hydrophobically using long-chain alkyl groups is the undesirably high level of bodying of the emulsion paint on storage. The consistency of emulsion paint increases sharply following its preparation and can more than double after one day of storage. This complicates the deliberate adjustment/monitoring of paint consistency by the paint manufacturer. A further disadvantage is the sharp reduction in the water solubility of the hydrophobically modified cellulose ethers even at low degrees of substitution.

DESCRIPTION OF THE RELATED ART

In EP-A-0 307 915 the attempt is made to improve the solubility of hydrophobically modified cellulose ethers by the additional introduction of a carboxymethyl group. A disadvantage, however, is the sensitivity of the carboxymethyl group to pH: it is protonated even in the weakly acidic range and so takes on a hydrophobic character itself. The carboxymethyl group is also sensitive to divalent ions, such as calcium ions, for example. Calcium compounds, however, are frequently used as fillers in aqueous emulsion paints.

P. Talaba, I. Srokova, P. Hodul and G. Cik in Chem. Papers 50 (2), 101 (1996) describe hydrophobically modified sulfoethylcelluloses. High degrees of substitution are necessary in these compounds, however, because of the absence of other substituents. They are water-soluble only at low degrees of polymerization, and possess a strong tendency to form foam, which is undesirable for use in emulsion paints.

EP-A-0 781 780 describes sulfoalkylated cellulose ethers modified hydrophobically using $C_{10}$–$C_{40}$ alkyl chains, these ethers likewise possessing a high surfactant action and being used as thickeners in cosmetic formulations. For these compounds a degree of sulfoalkylation of from 0.1 to 1 is claimed.

SUMMARY OF THE INVENTION

The object of the present invention is to provide water-soluble, hydrophobically modified cellulose derivatives which when used in emulsion paints cause only minimal bodying of the paints, comparable with that of cellulose ethers not hydrophobically modified, and which at the same time improve the non-drip characteristics of the paints when applied with a roller to an extent similar to that of the commercial cellulose ethers modified hydrophobically using long-chain alkyl groups. The invention also intends to provide cellulose derivatives which when used in emulsion paints bring about a substantial improvement in their non-drip characteristics even at relatively low paint viscosities, while at the same time allowing the paint to be easily spread (by brush or roller, etc.). In addition, the emulsion paint must attain good abrasion resistance.

DESCRIPTION OF THE PREFERRED EMBODIMENTS

The invention accordingly provides water-soluble ionic cellulose ethers from the group of hydroxyalkylcelluloses which are substituted by on average from 0.001 to 1.0, preferably from 0.001 to 0.2, alkyl group per anhydroglucose unit and carry from 0.01 to 0.1 sulfoalkyl group per anhydroglucose unit.

Preferred cellulose ethers are those of the formula

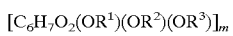

where $C_6H_7O_2$ is an anhydroglucose unit, m is 50–3000, especially 100–1000, and $R^1$, $R^2$, $R^3$ independently of one another are each a polyalkylene oxide chain of the formula

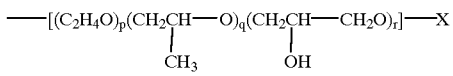

where $X=H$, $C_nH_{2n+1}$, $C_nH_{2n-1}O$, $CH_2$—$CH_2$—$SO_3Y$ or $CH_2$—$CHOH$—$CH_2SO_3Y$, $n=4$–$20$ and $Y=H$, Na or K, and in which p, q, and r independently of one another in $R^1$, $R^2$ and $R^3$ can each independently assume values from 0 to 4, the sum of all (p+q+r) added over $R^1$, $R^2$ and $R^3$ per anhydroglucose unit is on average greater than 1.3 and less than 4.5, preferably from 1.5 to 3.0, the sequence of the oxyalkylene units in the polyalkylene oxide chain is arbitrary, and the average number of hydrophobically modified groups per anhydroglucose unit (DS HM) is from 0.001 to 0.2, preferably from 0.01 to 0.04, and the average number of sulfoalkyl groups per anhydroglucose unit is from 0.01 to 0.1, preferably from 0.01 to 0.09. The sulfoalkyl groups are preferably sulfoethyl groups.

The present invention also provides processes for preparing the cellulose ethers of the invention by etherifying cellulose with an etherifying agent from the group of the alkylene oxides and etherifying with an alkyl halide or an alkyl glycidyl ether and a sulfonate, with base catalysis, or by etherifying ethers from the group of hydroxyalkylcelluloses with an alkyl halide or an alkyl glycidyl ether and a sulfonate, with base catalysis, preferably A) by etherifying cellulose with ethylene oxide, propylene oxide and/or glycidyl alcohol and an alkyl halide or an alkylene oxide or an alkyl glycidyl ether and an alkenylsulfonate or chloroalkylsulfonate, with base catalysis, preferably in a suspension medium;

B) by etherifying hydroxyethylcellulose, hydroxypropylcellulose, dihydroxypropylcellulose or a cellulose ether having two or more of said hydroxyalkyl substituents with an alkyl halide or an alkylene oxide or an alkyl glycidyl ether and an alkenylsulfonate or chloroalkylsulfonate, with base catalysis, preferably in a suspension medium.

Suspension media preferably used are lower alcohols or ketones, an example being isopropanol, tert-butanol or acetone, in a weight ratio to the cellulose of from 3:1 to 30:1, preferably from 8:1 to 15:1. As the base it is usual to use aqueous solutions of alkali metal hydroxides, especially sodium hydroxide. The molar ratio of base to anhydroglucose unit is determined by the carbohydrate (derivative) used. When using cellulose (method A) the molar ratio is preferably from 1.0 to 1.5; for products which are already etherified (method B) it is preferably from 0.1 to 1.0 mol of base per anhydroglucose unit.

The water content of the reaction mixture is preferably from 5 to 30, in particular from 10 to 20, mol of water per anhydroglucose unit.

After the suspension medium has been introduced as initial charge, the cellulose added and the batch rendered alkaline with the aqueous base, the batch is homogenized thoroughly and stirred without supply of heat, with cooling if desired, for preferably from 0.5 to 2 hours. The etherification reagents (epoxyalkanes, alkyl glycidyl ethers and/or alkyl halides and sulfonic acid derivatives) are subsequently added in unison or in succession. The batch is then brought preferably to a temperature in the range from 60 to 120° C., with particular preference from 80 to 100° C., and is heated for preferably from 2 to 6 hours. After cooling, it is neutralized with an acid, preferably hydrochloric acid, nitric acid and/or acetic acid, preferably to a pH of from 6 to 8. The suspension medium is removed by decantation or filtration. The crude cellulose mixed ether can be freed from the adhering byproducts, such as polyglycols, glycol ethers and salts, by extraction with aqueous alcohols or ketones having a preferred water content of from 10 to 50% by weight, especially isopropanol, ethanol and acetone. After drying under reduced pressure or at atmospheric pressure at from 50 to 120° C., the desired cellulose mixed ether is obtained as a colorless or slightly yellowish powder.

If required, the degree of polymerization desired in accordance with the invention for the cellulose ether can be established prior to or during its preparation process by the addition of a peroxo compound, such as hydrogen peroxide, or a peroxodisulfate salt or other oxidizing agent, sodium chloride being one example. These methods of decreasing the molecular weight, and the respective industrial procedure, are prior art (T. M. Greenway in "Cellulosic Polymers, Blends and Composites", ed. R. D. Gilbert, Carl Hanser Verlag, Munich, 1994, p. 178 ff.).

Suitable reaction apparatus for preparing the cellulose ether derivatives of the invention comprises, for example, stirred vessels, mixers and kneading apparatus. In principle it is possible to use any reaction apparatus which is customary for the preparation of cellulose derivatives having non-hydrophobic substituents and which allows sufficiently thorough mixing of the cellulose or water-soluble cellulose ether with the nonhydrophobic reagents.

The present invention additionally provides for the use in emulsion paints of water-soluble ionic cellulose ethers from the group of hydroxyalkylcelluloses which are substituted by on average from 0.001 to 1.0 alkyl group per anhydroglucose unit and carry from 0.01 to 0.4 sulfoalkyl group per anhydroglucose unit, and provides an emulsion paint comprising water-soluble ionic cellulose ethers from the group of hydroxyalkylcelluloses which are substituted by on average from 0.001 to 1.0 alkyl group per anhydroglucose unit and carry from 0.01 to 0.4 sulfoalkyl group per anhydroglucose unit.

The present invention is described in detail below by reference to working examples although without being restricted thereto.

EXAMPLES

Preparation Examples

Example 1

The hydrophobic reagent used is a $(C_{15}-C_{17})$-alkyl glycidyl ether from EMS-Chemie, Zurich (tradename Grilonit® RV 1814).

Finely ground pinewood pulp is suspended in virtually anhydrous isopropanol in a 2 l glass reactor with anchor stirrer. Following inertization (evacuation and flooding with nitrogen), 49.5% strength sodium hydroxide solution and water are run in with stirring at 25° C. The mixture is rendered alkaline at 25° C. for 60 minutes. Ethylene oxide is run in and the temperature is held at 40° C. for one hour and then at 80° C. for one hour. Then, at about 80° C., the desired amount of an alkyl glycidyl ether, dissolved in 20 g of isopropanol, is added and etherification is carried out at 80° C. for two hours. 28.3% strength aqueous sodium vinylsulfonate $(NaVSO_3)$ solution is added and the mixture is reacted at 80° C. for two to three hours. After cooling to room temperature, it is neutralized with approximately 20% strength hydrochloric acid. The product is filtered off with suction, washed with 80% strength aqueous acetone to a salt content of <0.50%, and dried at 75° C.

The quantities used and the degrees of substitution of the hydrophobically modified hydroxyethylsulfoethylcelluloses obtained are set out in Table 1.

TABLE 1

| Example 1 | Pulp | Isopropanol | H$_2$O | NaOH 49.5% | EO | Grilonit RV1814 | S*) | NaVSO$_3$ 28.3% | Product yield g | MS HE | DS HM | DS SE |
|---|---|---|---|---|---|---|---|---|---|---|---|---|
| A | 75.0 | 593 | 103.6 | 40.0 | 90.0 | — | 20 | 41.0 | 121.1 | 2.46 | — | 0.07 |
| B | 75.0 | 593 | 103.6 | 40.0 | 90.0 | 6.4 | 20 | 41.0 | 123.1 | 2.49 | 0.006 | 0.07 |
| C | 75.0 | 593 | 103.6 | 40.0 | 90.0 | 12.8 | 20 | 41.0 | 121.2 | 2.42 | 0.007 | 0.07 |
| D | 75.0 | 593 | 103.6 | 40.0 | 90.0 | 19.2 | 20 | 41.0 | 121.8 | 2.53 | 0.011 | 0.08 |
| E | 75.0 | 593 | 103.6 | 40.0 | 90.0 | 25.6 | 20 | 41.0 | 119.9 | 2.49 | 0.012 | 0.08 |
| F | 85.0 | 672 | 117.4 | 45.3 | 102.0 | — | 22.7 | 46.5 | 140.1 | 2.38 | — | 0.07 |
| G | 85.0 | 672 | 117.4 | 45.3 | 102.0 | 7.3 | 22.7 | 46.5 | 136.5 | 2.33 | 0.003 | 0.07 |
| H | 85.0 | 672 | 117.4 | 45.3 | 102.0 | 14.5 | 22.7 | 46.5 | 138.8 | 2.32 | 0.005 | 0.07 |
| I | 85.0 | 672 | 117.4 | 45.3 | 102.0 | 21.8 | 22.7 | 46.5 | 137.3 | 2.39 | 0.007 | 0.07 |
| J | 85.0 | 672 | 117.4 | 45.3 | 102.0 | 29.0 | 22.7 | 46.5 | 139.4 | 2.31 | 0.010 | 0.08 |
| K | 75.0 | 593 | 103.6 | 40.0 | 90.0 | — | 20 | 62.0 | 124.3 | 2.35 | — | 0.10 |

TABLE 1-continued

| Example 1 | Pulp | Isopropanol | H$_2$O | NaOH 49.5% | EO | Grilonit RV1814 | S*) | NaVSO$_3$ 28.3% | Product yield g | MS HE | DS HM | DS SE |
|---|---|---|---|---|---|---|---|---|---|---|---|---|
| L | 75.0 | 593 | 103.6 | 40.0 | 90.0 | 6.4 | 20 | 62.0 | 124.5 | 2.42 | 0.006 | 0.10 |
| M | 75.0 | 593 | 103.6 | 40.0 | 90.0 | 12.8 | 20 | 62.0 | 122.3 | 2.34 | 0.007 | 0.08 |
| N | 75.0 | 593 | 103.6 | 40.0 | 90.0 | 19.2 | 20 | 62.0 | 119.5 | 2.36 | 0.010 | 0.09 |
| O | 75.0 | 593 | 103.6 | 40.0 | 90.0 | 25.6 | 20 | 62.0 | 119.6 | 2.47 | 0.012 | 0.09 |

*)S = solvent for reagent

Example 2

The procedure is as in Example 1 except that a larger molar amount of ethylene oxide is used.

The amounts used and the degrees of substitution of the hydrophobically modified hydroxyethylsulfoethylcelluloses obtained are set out in Table 2.

TABLE 2

| Example 2 | Pulp | Isopropanol | H$_2$O | NaOH 49.5% | EO | Grilonit RV1814 | S*) | NaVSO$_3$ 28.3% | Product yield g | MS HE | DS HM | DS SE |
|---|---|---|---|---|---|---|---|---|---|---|---|---|
| A | 75.0 | 593 | 103.6 | 40.0 | 138.4 | — | 20 | 62.0 | 142.2 | 3.59 | — | 0.04 |
| B | 75.0 | 593 | 103.6 | 40.0 | 138.4 | 6.4 | 20 | 62.0 | 142.5 | 3.61 | 0.010 | 0.04 |
| C | 75.0 | 593 | 103.6 | 40.0 | 138.4 | 12.8 | 20 | 62.0 | 140.8 | 3.62 | 0.016 | 0.06 |
| D | 75.0 | 593 | 103.6 | 40.0 | 138.4 | 19.2 | 20 | 62.0 | 143.1 | 3.67 | 0.021 | 0.04 |
| E | 75.0 | 593 | 103.6 | 40.0 | 138.4 | 25.6 | 20 | 62.0 | 149.2 | 3.59 | 0.027 | 0.03 |
| F | 75.0 | 593 | 103.6 | 40.0 | 138.4 | 38.4 | 20 | 62.0 | 145.7 | 3.80 | 0.044 | 0.03 |
| G | 75.0 | 593 | 103.6 | 40.0 | 138.4 | 64.0 | 20 | 62.0 | 143.6 | 3.75 | 0.055 | 0.04 |

*)S = solvent for reagent

Example 3

The procedure is as in Example 2 except that high molecular mass linters pulp is used.

The amounts used and the degrees of substitution of the hydrophobically modified hydroxyethylsulfoethylcelluloses obtained are set out in Table 3.

Example 4

The procedure is as in Example 2. For oxidative adjustment to the molecular weight, etherification with the alkyl glycidyl ether is followed by addition of a small amount of 3% strength hydrogen peroxide solution, after which the temperature is held at 80° C. for 15 minutes. After that time, sodium vinylsulfonate is added.

The amounts used and the degrees of substitution of the hydrophobically modified hydroxyethylsulfoethylcelluloses obtained are set out in Table 4.

TABLE 3

| Example 3 | Pulp | Isopropanol | H$_2$O | NaOH 49.5% | EO | Grilonit RV1814 | S*) | NaVSO$_3$ 28.3% | Product yield g | MS HE | DS HM | DS SE |
|---|---|---|---|---|---|---|---|---|---|---|---|---|
| A | 75.0 | 593 | 103.6 | 40.0 | 138.4 | — | 20 | 62.0 | 151.9 | 3.00 | — | 0.04 |
| B | 75.0 | 593 | 103.6 | 40.0 | 138.4 | — | 20 | 62.0 | 149.0 | 3.54 | — | 0.09 |
| C | 75.0 | 593 | 103.6 | 40.0 | 138.4 | 6.4 | 20 | 62.0 | 148.6 | 3.64 | 0.009 | 0.09 |
| D | 75.0 | 593 | 103.6 | 40.0 | 138.4 | 12.8 | 20 | 62.0 | 149.3 | 3.56 | 0.013 | 0.09 |
| E | 75.0 | 593 | 103.6 | 40.0 | 138.4 | 19.2 | 20 | 62.0 | 146.0 | 3.54 | 0.020 | 0.08 |
| F | 75.0 | 593 | 103.6 | 40.0 | 138.4 | 25.6 | 20 | 62.0 | 147.6 | 3.41 | 0.022 | 0.07 |
| G | 75.0 | 593 | 103.6 | 40.0 | 138.4 | 38.4 | 20 | 62.0 | 147.6 | 3.31 | 0.036 | 0.07 |
| H | 75.0 | 593 | 103.6 | 40.0 | 138.4 | 64.0 | 20 | 62.0 | 150.6 | 3.35 | 0.051 | 0.07 |
| I | 85.0 | 672 | 117.4 | 45.3 | 156.9 | — | 22.7 | 22.7 | 160.0 | 3.18 | — | 0.03 |
| J | 85.0 | 672 | 117.4 | 45.3 | 156.9 | 7.3 | 22.7 | 22.7 | 163.5 | 3.04 | 0.011 | 0.02 |
| K | 85.0 | 672 | 117.4 | 45.3 | 156.9 | 14.5 | 22.7 | 22.7 | 164.1 | 3.32 | 0.016 | 0.01 |
| L | 85.0 | 672 | 117.4 | 45.3 | 156.9 | 21.8 | 22.7 | 22.7 | 157.4 | 3.31 | 0.020 | 0.01 |
| M | 85.0 | 672 | 117.4 | 45.3 | 156.9 | 29.0 | 22.7 | 22.7 | 160.7 | 3.41 | 0.027 | 0.02 |
| N | 85.0 | 672 | 117.4 | 45.3 | 156.9 | 43.5 | 22.7 | 22.7 | 166.0 | 3.36 | 0.037 | 0.02 |
| O | 85.0 | 672 | 117.4 | 45.3 | 156.9 | 72.5 | 22.7 | 22.7 | 166.7 | 3.44 | 0.063 | 0.01 |

*)S = solvent for reagent

TABLE 4

| Example 4 | Amounts used (g) | | | | | | | | Product yield g | Degrees of substitution | | |
|---|---|---|---|---|---|---|---|---|---|---|---|---|
| | Pulp | Isopropanol | $H_2O$ | NaOH 49.5% | EO | RV1814 | S*) | $H_2O_2$ 3% | $NaVSO_3$ 28.3% | MS HE | DS HM | DS SE |
| A | 85.0 | 672 | 112.0 | 45.3 | 156.9 | 21.8 | 22.7 | 5.5 | 70.3 | 156.6 | 3.21 | 0.027 | 0.05 |
| B | 85.0 | 672 | 114.6 | 45.3 | 156.9 | 21.8 | 22.7 | 2.8 | 70.3 | 160.2 | 3.62 | 0.023 | 0.07 |
| C | 85.0 | 672 | 116.0 | 45.3 | 156.9 | 21.8 | 22.7 | 1.4 | 70.3 | 160.3 | 3.65 | 0.021 | 0.08 |
| D | 85.0 | 672 | 112.0 | 45.3 | 156.9 | 29.0 | 22.7 | 5.5 | 70.3 | 156.7 | 3.54 | 0.024 | 0.06 |
| E | 85.0 | 672 | 114.6 | 45.3 | 156.9 | 29.0 | 22.7 | 2.8 | 70.3 | 161.0 | 3.54 | 0.028 | 0.08 |
| F | 85.0 | 672 | 116.0 | 45.3 | 156.9 | 29.0 | 22.7 | 1.4 | 70.3 | 162.0 | 3.59 | 0.025 | 0.08 |

*)S = solvent for reagent

Example 5

The procedure is as in Example 1. The hydrophobicizing reagent used is the glycidyl ether of a phenyl ethoxylate (5 ethylene oxide units) from Nagase Chemicals Ltd., Osaka (tradename Denacol® EX-145).

The amounts used and the degrees of substitution of the hydrophobically modified hydroxyethylsulfoethylcelluloses obtained are set out in Table 5.

Example 7

The procedure is as in Example 1. The suspension medium and solvent used is a mixture of tert-butanol and isopropanol.

The amounts used and the degrees of substitution of the hydrophobically modified hydroxyethylsulfoethylcelluloses obtained are set out in Table 7.

TABLE 5

| Example 5 | Amounts used (g) | | | | | | | | Product yield g | Degrees of substitution | | |
|---|---|---|---|---|---|---|---|---|---|---|---|---|
| | Pulp | Isopropanol | $H_2O$ | NaOH 49.5% | EO | Decanol EX-145 | S*) | $NaVSO_3$ 28.3% | | MS HE | DS HM | DS SE |
| A | 85.0 | 672 | 117.4 | 45.3 | 118.7 | — | 22.7 | 70.3 | 146.5 | 2.78 | — | 0.09 |
| B | 85.0 | 672 | 117.4 | 45.3 | 118.7 | 9.4 | 22.7 | 70.3 | 148.6 | 2.86 | 0.008 | 0.10 |
| C | 85.0 | 672 | 117.4 | 45.3 | 118.7 | 18.9 | 22.7 | 70.3 | 151.7 | 2.95 | 0.016 | 0.10 |
| D | 85.0 | 672 | 117.4 | 45.3 | 118.7 | 28.3 | 22.7 | 70.3 | 147.5 | 2.97 | 0.027 | 0.09 |
| E | 85.0 | 672 | 117.4 | 45.3 | 118.7 | 37.8 | 22.7 | 70.3 | 147.2 | 3.02 | 0.033 | 0.09 |

*)S = solvent for reagent

Example 6

The procedure is as in Example 1. The hydrophobicizing reagent used is the glycidyl ether of a lauryl ethoxylate ($C_{12}$ alkyl with 15 ethylene oxide units) from Nagase Chemicals Ltd., Osaka (tradename Denacol® EX-171).

The amounts used and the degrees of substitution of the hydrophobically modified hydroxyethylsulfoethylcelluloses obtained are set out in Table 6.

TABLE 6

| Example 6 | Amounts used (g) | | | | | | | | Product yield g | Degrees of substitution | | |
|---|---|---|---|---|---|---|---|---|---|---|---|---|
| | Pulp | Isopropanol | $H_2O$ | NaOH 49.5% | EO | Decanol EX-171 | S*) | $NaVSO_3$ 28.3% | | MS HE | DS HM | DS SE |
| A | 85.0 | 672 | 117.4 | 45.3 | 118.7 | — | 22.7 | 70.3 | 146.5 | 2.78 | — | 0.09 |
| B | 85.0 | 672 | 117.4 | 45.3 | 118.7 | 23.0 | 22.7 | 70.3 | 146.5 | 2.82 | 0.006 | 0.09 |
| C | 85.0 | 672 | 117.4 | 45.3 | 118.7 | 23.0 | 22.7 | 70.3 | 147.2 | 2.69 | 0.006 | 0.10 |
| D | 85.0 | 672 | 117.4 | 45.3 | 118.7 | 46.1 | 22.7 | 70.3 | 148.1 | 2.83 | 0.010 | 0.11 |
| E | 85.0 | 672 | 117.4 | 45.3 | 118.7 | 46.1 | 22.7 | 70.3 | 150.3 | 2.89 | 0.009 | 0.10 |
| F | 85.0 | 672 | 117.4 | 45.3 | 118.7 | 69.1 | 22.7 | 70.3 | 151.9 | 2.92 | 0.012 | 0.10 |
| G | 85.0 | 672 | 117.4 | 45.3 | 118.7 | 92.1 | 22.7 | 70.3 | 150.7 | 3.09 | 0.017 | 0.11 |

*)S = solvent for reagent

TABLE 7

| Example 7 | Amounts used (g) | | | | | | | Product yield g | Degrees of substitution | | |
|---|---|---|---|---|---|---|---|---|---|---|---|
| | Pulp | t-BuOH + IPA | H₂O | NaOH 49.5% | EO | Grilonit RV1814 | S*) | NaVSO₃ 28.3% | | MS HE | DS HM | DS SE |
| A | 85.0 | 672 | 117.4 | 45.3 | 119.0 | 21.8 | 22.7 | 70.3 | 145.2 | 3.24 | 0.021 | 0.09 |
| B | 85.0 | 672 | 117.4 | 45.3 | 112.1 | 21.8 | 22.7 | 70.3 | 177.2 | 3.28 | 0.021 | 0.11 |
| C | 85.0 | 672 | 117.4 | 45.3 | 119.0 | 21.8 | 22.7 | 46.9 | 169.4 | 3.50 | 0.026 | 0.08 |

*)S = solvent for reagent

The cellulose derivatives prepared in Examples 1 to 7 are incorporated as thickeners into various emulsion paints and their action is compared with the prior art thickeners.

In the formulation of a satin finish paint, the rheology, stability, gloss and application properties of the paint are investigated. The composition of the formulation is as follows:

| Parts by weight | Components |
|---|---|
| 207 | Water |
| 2 | Preservative (® Mergal K 9 N), from Riedel de Haën GmbH, DE |
| 20 | Polyphosphate (10% strength ® Calgon N) from BK Giulini GmbH, DE |
| 5 | Dispersant (® Lopon 894) from BK Giulini GmbH, DE |
| 4 | Defoamer (® Agitan 295) from Münzing Chemie GmbH, DE |
| Variable | Thickener |
| 225 | Titanium dioxide (® Hombitan R 611) from Sachtleben, DE |
| 50 | Filler (kaolin, ® China Clay Speshwhite) from ECC International, GB |
| 75 | Filler (CaCO₃, ® Hydrocarb OG) from Omya GmbH, DE |
| 2 | Sodium hydroxide (10% strength) |
| 460 | Acrylate dispersion (® Mowilith LDM 7712) from Clariant GmbH, DE |
| 10 | Film former, butyl diglycol acetate |

Thickener:
Sample A: 5 parts by weight of cellulose derivative of Example 4A
Sample B: 5 parts by weight of cellulose derivative of Example 4B
Sample C: 5 parts by weight of cellulose derivative of Example 4C
Sample D: 5 parts by weight of cellulose derivative of Example 4D The following prior art thickeners are used for comparison with the cellulose derivatives of the present invention. All thickener viscosities (mPa·s) are measured in 2% strength aqueous solution at 20° C. in a Höppler falling-ball viscometer in accordance with DIN 53015.
Sample E: 5 parts by weight of methylhydroxyethylcellulose, viscosity 6000 mPa·s, 2% strength
Sample F: 5 parts by weight of hydroxyethylcellulose, viscosity 6000 mPa·s, 2% strength
Sample G: 5 parts by weight of hydroxyethylcellulose with long-chain alkyl radical, viscosity 6000 mPa·s, 2% strength
Sample H: 5 parts by weight of hydroxyethylcellulose, viscosity 6000 mPa·s, 2% strength+5 parts by weight of polyurethane thickener®Acrysol RM 2020

Directly following production of the paint, and after conditioning at 23° C./1 day, the paint viscosities are measured using the Brookfield rheometer (Spindel 6 at 10 min$^{-1}$ and 100 min$^{-1}$, 23° C.). The quotient formed from the viscosity at 100 min$^{-1}$ and 10 min$^{-1}$ can be used as a measure of the pseudoplasticity. High values denote lower pseudoplasticity and closer approximation to the ideally Newtonian behavior.

The viscosity values found indicate a lesser degree of bodying of the products of the invention (Samples A to D) in comparison to conventional cellulose ethers (Samples E and F) and the hydrophobically modified cellulose ether (Sample G) and the thickener combination (Sample H).

Following an aging period of one day following preparation of the emulsion paints, the paints are applied using a brush, and the brushability and appearance of the applied paint films are assessed in accordance with a scale of ratings (see Remarks on evaluation).

For quantitative assessment of the nondrip behavior of an emulsion paint the following test is carried out, which reconstructs the application of the paint using a roller:

A conditioned paint roller is loaded with a defined amount (35 ml) of emulsion paint and rolled a number of times, using motor-driven reciprocal motions, over a paint stripper grid customary in the art. The pressure with which the roller is applied is kept constant. At the bottom of a dish which serves to support the rectangular grid there is a black card. The drips of paint falling on it are compared visually in terms of their number and areal extent and are assessed in accordance with a fixed scale of ratings (see Remarks on evaluation).

The gloss of the dry paint film is measured using a reflectometer at an angle of 60°.

| Viscosity Brookfield RVT (mPa s) | Sample A | Sample B | Sample C | Sample D | Sample E | Sample F | Sample G | Sample H |
|---|---|---|---|---|---|---|---|---|
| after preparation | | | | | | | | |
| 10 min$^{-1}$ | 6910 | 9240 | 13700 | 10000 | 23800 | 14700 | 6360 | 16100 |
| 100 min$^{-1}$ | 2550 | 3310 | 4000 | 3490 | 3840 | 2420 | 1580 | 3020 |
| quotient 100 min$^{-1}$/10 min$^{-1}$ | 0.37 | 0.36 | 0.29 | 0.34 | 0.16 | 0.16 | 0.25 | 0.19 |
| after 1 day | | | | | | | | |
| 10 min$^{-1}$ | 8800 | 10300 | 15900 | 10900 | 31700 | 21300 | 11200 | 33500 |
| 100 min$^{-1}$ | 3270 | 3620 | 5290 | 4150 | 5160 | 3530 | 2830 | 6020 |
| quotient 100 min$^{-1}$/10 min$^{-1}$ | 0.37 | 0.35 | 0.30 | 0.36 | 0.16 | 0.16 | 0.25 | 0.18 |
| bodying (%) | | | | | | | | |
| 10 min$^{-1}$ | 27.4 | 11.5 | 16.1 | 9.0 | 33.2 | 44.9 | 76.1 | 108.1 |
| 100 min$^{-1}$ | 26.3 | 9.4 | 32.2 | 18.9 | 34.8 | 45.9 | 79.1 | 99.3 |
| syneresis | 0 | 0 | 0 | 0 | 0 | 3 | 0 | 3 |
| 60° C. gloss (%) | 18.8 | 18.1 | 17.2 | 15.3 | 10.9 | 13.0 | 14.9 | 13.7 |
| paint drip test | 1+ | 1+ | 1+ | 1 | 2− | 3 | 1 | 2 |
| brushability | 1 | 1 | 1 | 1 | 1 | 1 | 1 | 1− |
| flow | 1 | 1 | 1 | 1 | 3 | 2− | 2 | 2− |

Remarks on evaluation:

Paint drip test:
1 = slight dripping
2 = dripping
3 = severe dripping
4 = slight plashing
5 = splashing
6 = severe splashing Brushability:
1 = very readily brushable
2 = readily brushable
3 = less readily brushable
4 = hard to brush (viscous)
5 = very hard to brush Flow:
1 = smooth surface
2 = slight brushstroke marks
3 = distinct brushstroke marks
4 = severe brushstroke marks
5 = very severe brushstroke marks The wash resistance of different thickeners is investigated in a solvent-free interior pain having the following formulation.

| Parts by weight | Components |
|---|---|
| 290 | Water |
| 1 | Preservative (® Mergal K 9 N), from Riedel de Haën GmbH, DE |
| 10 | Polyphosphate (10% strength ® Calgon N) from BK Giulini GmbH, DE |
| 3 | Dispersant (® Mowiplus XW 330) from Clariant GmbH, DE |
| 2 | Defoamer (® Tego Foamex KS 6) from Tego Chemie GmbH, DE |
| 5 | Thickener |
| 80 | Titanium dioxide (® Bayertitan RKB-2) from Bayer AG, DE |
| 200 | Filler (CaCO$_3$, ® Omyacarb 5 GU) from Omya GmbH, DE |
| 200 | Filler (CaCO$_3$, ® Omyacarb 2 GU) from Omya GmbH, DE |
| 30 | Filler (mica, ® Plastorit 000) from Luzenac Group, F |
| 50 | Filler (kaolin, ® China Clay Grade B) from ECC International, GB |
| 1 | Sodium hydroxide solution (10% strength) |
| 120 | Acrylate dispersion (® Mowilith LDM 7712) from Clariant GmbH, DE |
| 8 | Film former, butyl diglycol acetate |
| 1000 | |

Thickeners
Sample A: Cellulose derivative from Example 2C
Sample B: Cellulose derivative from Example 2D
Sample C: Cellulose derivative from Example 2E The following prior art thickeners are used for comparison with the cellulose derivatives of the present invention. All thickener viscosities (mPa·s) are measured in 2% strength aqueous solution at 20° C. in a Höppler falling-ball viscometer in accordance with DIN 53 015.

Sample D: Hydroxyethylcellulose, viscosity 30,000 mPa·s/2% strength

Sample E: Methylhydroxyethylcellulose, viscosity 30,000 mPa·s/2% strength

Sample F: Hydroxyethylcellulose with long-chain alkyl radical, viscosity 6000 mPa·s/2% strength In order to assess the wash resistance of the finished paints, a film drawing apparatus is used to draw down paint films with a dry film thickness of 100 μm. The wash resistance is tested in accordance with DIN 53778 Part 2 following conditioning for 28 days at 23° C./50% relative atmospheric humidity.

| Sample | Number of shear cycles |
|---|---|
| A | 974 |
| B | 1270 |
| C | 1347 |
| D | 1347 |
| E | 1047 |
| F | 1047 |

The cellulose derivatives of the invention result in less bodying of the paints on storage and have a pseudoplasticity markedly lower than that of cellulose ethers modified hydrophobically using long-chain alkyl groups. Relative to the cellulose ethers without hydrophobic modification, the cellulose derivatives of the invention bring about greatly reduced dripping of the emulsion paint. Advantages are evident in terms of gloss and flow. The good washing stability of the finished emulsion paints is retained despite the introduction of water soluble sulfoethyl groups. As compared with combinations of conventional cellulose ethers with synthetic polyurethane thickeners, the possibility exists of preparing paints with reduced thickener concentrations to achieved the desired paint consistency.

What is claimed is:

1. An emulsion paint comprising one or more water-soluble ionic cellulose ethers selected from the group consisting of hydroxyalkylcelluloses having on average from 0.001 to 1.0 alkyl group per anhydroglucose unit and from 0.01 to 0.4 sulfoalkyl group per anhydroglucose unit, wherein the degree of hydroxyalkylation is from about 3 to about 4.

* * * * *